Patented July 24, 1951

2,562,062

UNITED STATES PATENT OFFICE 2,562,062

FUNGICIDAL ALUMINUM LEAFING PIGMENT

Francis B. Rethwisch, Louisville, Ky., and Gordon M. Babcock, Plainfield, N. J., assignors to Reynolds Metals Co., Richmond, Va., a corporation of Delaware No Drawing. Application June 19, 1947, Serial No. 755,734

3 Claims. (Cl. 106—290)

The object of the present invention is to provide an improved fungicidal leafing pigment incorporating aluminum leafing flake, which pigment is characterized by the presence of a copper soap, copper napthenate being preferred, as a fungicidal agent, together with an agent which stabilizes the copper soap and restrains a deleafing characteristic which we have discovered prevents its commercial utilization as a leafing pigment. Thus, copper napthenate is an excellent fungicide and possesses the further advantage of being water repellant. Heretofore, it has not been feasible to use copper napthenate in conjunction with aluminum leafing flake, because when used in operative proportions a reaction results which results in destructive action on the leafing characteristic of the flake. This invention overcomes such deleterious action.

The invention relates particularly to aluminum paste leafing pigments suitable for a mixture with fluid carriers to form aluminum paint. Pastes of such kind consist essentially of aluminum flakes having a leafing or mirroring characteristic imparted to the flakes either during or subsequent to their formation. In one method, comminuted aluminum with a liquid thinner, Varnolene or other petroleum fractions of the naptha group being examples, and a leafing agent, such as stearic or palmitic acid, are subjected to the action of a ball mill which is operated to reduce the metal to flake-like particles and simultaneously provide a film on the flakes which imparts a leafing property thereto so that they will float on the surface of the fluid vehicle in the paint. In other words, upon the aluminum flake is film surfacing by the stearic acid or other leafing acid, and the paste consists of coated flakes, a proportion of the hydrocarbon liquid thinner, and possibly some aluminum stearate which is produced by the ball mill operation. In a second method, the aluminum particles are converted to leafing flake form by means of a stamp mill in the presence of stearic acid or other saturated fatty acid, and the desired paste form is secured by adding a petroleum fraction thinner.

It has been known for many years that copper napthenate solution forms an excellent fungicidal material and it possesses the further advantage of being water repellant. When, however, it is added to aluminum leafing paste, a reaction occurs which attacks the leafing film upon the aluminum flake particles, depriving them of their leafing properties. Also the green coloration of the copper napthenate bleeds through to the surface of the paint rendering it non-commercial from this standpoint alone. This deleafing characteristic of copper napthenate occurs when the proportion of copper napthenate is as low as 8 per cent of the paste, and the deleafing is accelerated as the proportion of copper napthenate is increased.

It is a specific object of the present invention to employ a copper soap, particularly copper napthenate, in such percentages with aluminum leafing flake as to produce very highly efficient fungoidal pigment, and to satisfactorily restrain the deleafing which inevitably would occur.

As an example, a ball mill was charged with comminuted aluminum, a liquid thinner and a leafing agent, and the mill operated to reduce the metal to fine flake-like particles, and at the same time, to impart a leafing characteristic to the aluminum flake. The mill received an excess of thinner and the resulting sludge was subjected to a filtering operation to produce a filter cake. This cake, broken down into its constituents for specification of volatile and non-volatile content, was as follows:

| Contents | Solids, in Pounds | Volatile, in Pounds |
|---|---|---|
| Aluminum Pigment | 55.1 | 23.6 (largely Mineral Spirits). |
| Stearic Acid | 1.57 | 0.0. |

To this filter cake was thoroughly mixed copper napthenate solution (8% Cu) having a solid content of 14.3 lbs. and a volatile content of 5.3 pounds.

Well within two weeks the leafing characteristics had so been destroyed as to render the product non-commercial as a leafing paste.

To an identical filter cake was added, and thoroughly mixed, a solution of 0.16 lb. chlorinated phenol, to wit, chloro 2 phenyl phenol. After one year tests of the paste were made and it was found that it was fully leafing, there being no impairment. Paint made therefrom and thoroughly tested evidenced no bleeding whatever and full leafing. Subsequent tests have shown that the leafing and non-bleeding quality of the paste will remain for years, and that paints made therefrom pass the requirements of the stringent fungicidal tests of Army-Navy Specification JAN-C-173 (March 23, 1945). Further tests show that the chlorinated phenols generally are operative in the stabilization of the copper soap, including, of course, tetrachlorphenol and pentachlor-phenol.

The ratio of the chlorinated phenol to the copper soap is important. For example, from one standpoint alone, i. e., drying time of paint made from the paste, the chlorinated phenol preferably should not exceed 4% relatively to copper soap solution of 8% Cu content. However, with some sacrifice of drying time, its proportion can be raised to 0.5% of the copper content of the soap, and even higher. Also, the chlorinated phenol should not be lower than .35% of the copper napthenate solution of the stated strength. Such is the operation range from the best commercial standpoint. Although copper napthenate is preferred, being readily available in standard quality, other copper soaps, for example, copper stearate, etc. may be used. 8% Cu content is preferable and where the Cu content is lower or above the volume may be adjusted proportionately.

As a second example, a paste was made having the same proportion of aluminum pigment as in the example above, copper napthenate solution (8% Cu content), 11.75 lbs.; stearic acid, 1.55 lbs.; and pentachlor-phenol 0.40 lb. Maintenance of leafing and non-bleeding was satisfactorily obtained.

The aluminum fungicidal leafing pigment subject of the invention can be used with any paint or varnish vehicle normally satisfactory for use with leafing aluminum pigments, to make a paint or coating which accomplishes in one operation the sealing of the active constituents in the wood by virtue of the carrier, such as oil or varnish, and the provision of a metallic shield by the aluminum flake, with its full leafing value, brilliance and reflectivity. Paint so made will protect organic surfaces against molds and chewing and boring insects.

Having described our invention, what we claim and desire to secure by Letters Patent is as follows:

1. A fungicidal paste pigment consisting of aluminum leafing flake, a fatty leafing agent, a hydrocarbon thinner, copper soap in proportion normally deleterious to the maintenance of the leafing power of the aluminum flake and not less than 8 percent of the combined flake, leafing agent and thinner, with a copper content in said soap of about 8 per cent and chlorinated phenol not exceeding about 4% by weight of the copper soap and not less than about 0.2755% of said copper soap.

2. A fungicidal coating composition comprising aluminum leafing flake with a fatty leafing agent and a hydrocarbon thinner, and in which the fungicidal material is a copper soap not less than 8 percent of the combined flake, leafing agent and thinner, and with a copper content in said soap of about 8 percent chlorinated phenol not substantially less than 0.2755%, and not substantially greater than 4%, relatively to the copper content of the soap, and a fluid carrier selected from the group consisting of paint oils and varnish.

3. A fungicidal aluminum leafing paste consisting of about 55.1% aluminum flake, about 1.52% of stearic acid, about 14.3% copper napthenate, about 28.9% hydrocarbon thinner, and about 0.16% chlorinated phenol.

FRANCIS B. RETHWISCH.
GORDON M. BABCOCK.

No references cited.